US009783056B2

(12) United States Patent
Klein et al.

(10) Patent No.: US 9,783,056 B2
(45) Date of Patent: Oct. 10, 2017

(54) OPERATOR PLATFORM FOR A CONSTRUCTION MACHINE AND CONSTRUCTION MACHINE HAVING AN OPERATOR PLATFORM

(71) Applicant: BOMAG GmbH, Boppard (DE)

(72) Inventors: Thomas Klein, Wehr (DE); Stefan Kuhn, Steinbach (DE); Nico Wilhelm, Boppard (DE); Thorsten Anheier, Kobern-Gondorf (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 14/876,300

(22) Filed: Oct. 6, 2015

(65) Prior Publication Data

US 2016/0096554 A1    Apr. 7, 2016

(30) Foreign Application Priority Data

Oct. 7, 2014  (DE) .................. 10 2014 014 941

(51) Int. Cl.
| | |
|---|---|
| *B60K 37/00* | (2006.01) |
| *E01C 23/088* | (2006.01) |
| *E02F 9/16* | (2006.01) |
| *B60N 2/04* | (2006.01) |
| *B60N 2/14* | (2006.01) |
| *E02F 9/20* | (2006.01) |

(52) U.S. Cl.
CPC ............... *B60K 37/00* (2013.01); *B60N 2/04* (2013.01); *B60N 2/146* (2013.01); *E01C 23/088* (2013.01); *E02F 9/166* (2013.01); *E02F 9/2004* (2013.01); *E01C 2301/30* (2013.01)

(58) Field of Classification Search
CPC ........ B60K 37/00; E02F 9/2004; E02F 9/166; B60N 2/146; B60N 2/04; E01C 23/088
USPC ................. 296/65.01, 65.06, 65.11
See application file for complete search history.

(56) References Cited

U.S. PATENT DOCUMENTS

| | | | | |
|---|---|---|---|---|
| 3,951,373 A | * | 4/1976 | Swenson ................ | B60N 2/501 248/157 |
| 4,026,379 A | * | 5/1977 | Dunn ..................... | B60N 2/143 105/342 |
| 4,057,213 A | * | 11/1977 | Kokkila ................... | B60N 2/39 248/596 |

(Continued)

FOREIGN PATENT DOCUMENTS

DE     10 2012 024 770 A1    6/2014

*Primary Examiner* — Jason S Morrow
*Assistant Examiner* — E Turner Hicks
(74) *Attorney, Agent, or Firm* — Wood Herron & Evans LLP (57) ABSTRACT

The present invention relates to an operator platform for a construction machine and to a construction machine, particularly a road construction machine such as a road milling machine or a road paver, with an operator platform. The operator platform comprises an operator platform base, an operating panel and an operator seat, wherein an operating panel mount with a pivoting device is provided, by means of which the operating panel is pivotable about a vertical pivot axis between a first pivoting position and a second pivoting position. The operating panel mount comprises a height adjustment device which is configured such that the operating panel can be locked at different height positions independently of the pivoting positions.

20 Claims, 9 Drawing Sheets

(56) References Cited

U.S. PATENT DOCUMENTS

| | | | | |
|---|---|---|---|---|
| 4,262,958 A * | 4/1981 | Houseman | ............... | B60N 2/14 |
| | | | | 180/89.14 |
| 5,016,722 A * | 5/1991 | Morita | ..................... | B62D 1/18 |
| | | | | 180/89.14 |
| 5,941,498 A * | 8/1999 | Hoshihara | .............. | B60N 2/146 |
| | | | | 248/425 |
| 6,276,749 B1 * | 8/2001 | Okazawa | ............. | B60N 2/4693 |
| | | | | 180/329 |
| 7,121,608 B2 * | 10/2006 | Billger | ................... | B60N 2/002 |
| | | | | 180/329 |
| 7,631,927 B2 * | 12/2009 | Ayabe | ..................... | B60R 21/11 |
| | | | | 296/190.08 |
| 2010/0019539 A1 * | 1/2010 | Nakamura | ............ | B62D 21/186 |
| | | | | 296/190.04 |
| 2013/0241251 A1 * | 9/2013 | Jones | ....................... | B60N 2/14 |
| | | | | 297/217.1 |
| 2013/0264139 A1 * | 10/2013 | Braun | ........................ | E02F 9/16 |
| | | | | 180/322 |

* cited by examiner

OPERATOR PLATFORM FOR A CONSTRUCTION MACHINE AND CONSTRUCTION MACHINE HAVING AN OPERATOR PLATFORM

CROSS-REFERENCE TO RELATED APPLICATION

The present application claims priority under 35 U.S.C. §119 of German Patent Application No. 10 2014 014 941.2, filed Oct. 7, 2014, the disclosure of which is hereby incorporated herein by reference in its entirety.

FIELD OF THE INVENTION

The present invention relates to an operator platform for a construction machine and to a construction machine, particularly a road construction machine such as a road milling machine or a road paver having such an operator platform.

BACKGROUND OF THE INVENTION

Construction machines, in particular, self-propelled construction machines, often comprise an operator platform having an operator seat and an operating panel. Operation of the construction machine is directed from the operator platform. In order to enable a good operational comfort, in particular when working over longer periods, the operator platform frequently comprises an operator seat from which an operator located on the operator platform may enter operating instructions required for the operation of the construction machine via the operating panel. Besides driving instructions, this often also includes instructions for controlling working devices, such as, for example, the milling device of a road milling machine. A generic construction machine, specifically of the road milling machine type, is known from DE 10 2012 024 770 A1, for example.

In construction machines, it is frequently desired that the operator located on the operator platform has a good view of the working area. In order to have an optimal view of the working area depending on the respective working situation, it may be necessary for the operator to change his or her current position on the operator platform. As a result, however, in many cases the position of the operator changes relative to the operating panel, so that a comfortable seating position may no longer be possible or the visibility conditions may no longer fulfill the desired requirements.

Furthermore, construction machines operators tend to feel more comfortable when they can regularly alternate between an operating position sitting on the operator seat, hereinafter referred to as seated operating position, and an operating position standing on the operator platform, hereinafter referred to as standing operating position.

A generic operator platform for a construction machine comprises a platform base, an operating panel and an operator seat. Further, it is known that an operating panel mount having a pivoting device is provided, which is configured such that the operating panel is pivotable about a vertical pivot axis between a first and a second pivoting position. As a result of the pivotable configuration of the operating panel, the operator can adjust at least the position of the operating panel to different positions of the operator on the operator platform. However, comfortable operation of the operating panel is frequently no longer possible in both positions. Thus, the operating panel mount refers to the device via which the operating panel is connected to the operator platform, in particular to the operator platform base. Another specific construction machine in which the aforesaid disadvantages are also particularly apparent is a road paver.

SUMMARY OF THE INVENTION

It is therefore the object of the present invention to specify an operator platform which is improved with respect to the operational comfort compared to the prior art. The operator platform should ideally enable optimum visibility conditions to an operator located on the operator platform in typical working situations, particularly in each case from a position seated on the operator seat. The operator platform shall particularly be suitable for a road milling machine or a road paver.

One aspect of the present invention is that the operating panel mount comprises a height adjustment device which is configured such that the operating panel can be set in various height positions regardless of its current pivoting position. Various height positions means an adjustment in the vertical direction. As a result, the operator located on the operator platform has the option of adjusting the operating panel in height to the seated operating position and the standing operating position. The operating panel mount thus enables pivoting the operating panel about a vertical axis by means of the pivoting device and at the same time adjusting in the vertical direction by means of the height adjustment device, whereby the operator can adapt the position of the operating panel particularly well to his or her individual requirements.

The height adjustment device is ideally configured such that the operating panel is continuously adjustable within an adjustment range extending in the vertical direction. Thus, within the adjustment range, the operator can freely select the height the operating panel is to be set to. As a result, the respective optimum height position of the operating panel can be set for operators of different heights. For example, this can be achieved with a suitable clamping device, a valve, a spindle device or similar devices depending on the specific configuration of the height adjustment device.

It is basically possible that a support device is provided which facilitates the height adjustment to the operator, in particular in the upward direction. Use of a gas pressure spring, particularly acting in the upward direction, has proven to be optimum for this purpose. Said spring provides a high functional reliability along with a comparatively small installation space. Additionally or alternatively, other types of support devices may of course be used here, such as electric motor operated support devices with an electric motor or hydraulic motors. Furthermore, such support devices usually provide the advantage that the operating panel does not readily move downward without dragging and in an uncontrolled manner during an adjustment in the downward direction.

Basically, it is possible to configure the height adjustment device and the pivoting device as spatially separated and spaced apart units. However, a particularly compact configuration of the operating panel mount with height adjustment device and pivoting device is achieved if the pivoting device is disposed very close to the height adjustment device or if it is even integrated in said height adjustment device. The adjustment axis of the height adjustment device particularly preferably runs coaxially with the pivot axis of the pivoting device. The adjustment axis here designates the axis along which the operating panel is moved for height adjustment regardless of the pivoting position of the operating panel. As a result, the free space that has to be kept free for the adjustment of the operating panel on the operator platform can be kept comparatively small.

The operating panel mount preferably comprises a support column extending in the vertical direction from the operator platform base and having a base region and a head region. The base region designates the end of the support column facing the operator platform base and the head region designates the upper end of the support column facing the operating panel opposite the base region in the vertical region. Ideally a pivot joint is provided in the head region of the support column by means of which the operating panel is pivotable with the support column about the vertical pivot axis. Thus, the connection between the operating panel and the support column occurs via the pivot joint, wherein the operating panel may comprise a suitable connection bracket to that end, for example. In this refinement, the operating panel is particularly preferably set on top of the head region coming from the upper side, although it is generally also possible to attach the operating panel to the head region of the support column, for example, laterally. However, the first variant results in a particularly compact overall design as well.

In order to ensure a predefined and reliable pivoting position of the operating panel for the operator, a locking device is provided which is configured such that is arrests the pivoting position of the operating panel relative to the operating panel mount, in particular by means of a form-fit. To that end, the locking device may comprise a notched rim, for example, in particular in the form of a sprocket segment, and a latching element adjustable between a released position and a latching position, the latching element engaging the sprocket in the latching position and being out of engagement relative to the sprocket in the released position. Thus, the latching element is an adjustable locking element of the locking device. A notched rim is advantageous in that it provides a very stable rotational positioning of the operating panel at very fine steps although a continuous positioning of the panel is not enabled.

Generally, a plurality of different configurations can be used for operating the locking device. However, a configuration of an operating element such that it comprises a control lever arranged underneath the operating panel has proven to be ideal. The control lever is used for adjusting the above mentioned latching element, for example. The control lever may also be arranged laterally with respect to the operating panel.

Further, the operating element is preferably loaded by a force acting toward the arresting position, in particular, spring-loaded. This ensures that the operating element in the non-actuated state always assumes a position that locks the operating panel with regard to its pivoting position, thereby increasing operational safety.

Structurally, the control lever is preferably configured as an element fixedly connected to the adjustable locking element, particularly the latching element, or as a fixedly interconnected aggregate. This facilitates the installation.

In another aspect, the present invention relates to an operator platform for a construction machine, particularly a road construction machine, especially a road milling machine or a road paver, comprising an operator platform base, an operating panel and an operator seat, wherein an operating panel mount with a pivoting device is provided, by means of which the operating panel is pivotable about a vertical pivot axis between a first and a second pivoting position. The operator platform is particularly also implemented as comprising the features according to the above embodiments regarding the height adjustment device.

According to the present invention, provision is made for the operator seat to be mounted on an operator seat mount which is configured such that the operator seat is adjustable between a position retracted relative to the operator platform base and a position projecting at least partially relative to the operator platform base. The retracted position is characterized in that, as regarded in a top view, the operator seat is positioned completely within the operator platform, in particular the operator platform base. The extended position differs in that the operator seat in said position partially projects sideward from the operator platform, particularly the operator platform base. Here, the operator seat particularly at least partially projects beyond a lateral outer wall of the construction machine. Thus, provision is particularly also made for the construction machine to comprise a recess with respect to its side walls, through which recess the operator seat may project beyond the side wall of the construction machine in the extended position. In said position, the operator seated in the operator seat has a particularly good view from the operator platform over the ground material located next to the construction machine in the working direction. It is essential that the operator seat mount enables adjustment independent from the operating panel mount. Thus, adjustment the operator seat by means of the operator seat mount will therefore not necessarily also result in a simultaneous adjustment of the operating panel. A particularly wide range of possible relative positions between the operating panel and the operator seat may be obtained as a result.

Adjustment of the operator seat between the retracted and the extended position is preferably effected by means of a pivoting device pivotable about a pivot axis, particularly a vertical pivot axis. The pivoting device may be configured such that adjustment is performed continuously about the vertical pivot axis. As an alternative, it is also possible to configure the pivoting device such that it enables an adjustment in steps about the pivot axis, wherein in this case adjustment steps have proven to be particularly preferred in the range of from 2° to 10° and especially in the range of from 4° to 6° with respect to the vertical pivot axis. The overall adjustment range is preferably in a range of from 70° to 130°, in particular, for example, an adjustment angle of approximately 100°.

In a specific configuration of the operator seat mount, the pivoting device preferably comprises a pivoting arm with a seat end and an operator platform end. At the seat end, an operator seat mount is provided by means of which the operator seat is mounted on the pivoting arm. At the operator platform end, on the other hand, a pivoting arm mount is provided by means of which the pivoting arm is pivotable about the vertical pivot axis relative to the operator platform base. More particularly, the pivoting arm is connected to the operator platform base at this end in an articulate manner, i.e., has a connection toward the operator platform base. The pivoting arm enables that the operator seat is not adjustable about a seat axis but along a pivot curve, the center of said curve being the pivot axis of the pivoting arm. As a result, a great adjustment range of the operator seat relative to the operator platform base can be achieved. Ideally the operator seat at the seat end is rotatably connected to the pivoting arm. As a result, the operator may adjust the operator seat not only about the vertical pivot axis of the pivoting arm relative to the operator platform base but additionally also about another vertical rotational axis relative to the pivoting arm in order to obtain an optimum seat orientation relative to the operator platform in each case, for example.

Preferably, the pivoting arm is part of a link mechanism, in particular a four-joint link mechanism. This enables adjustment of the operator seat such that it takes parallel displaced positions to its respective starting position when the pivoting arm is moved. The link mechanism is ideally configured as a plane mechanism. Such an involvement of the pivoting arm in a link mechanism provides the operator with a secure feeling for the adjusting process.

An even more comprehensive variability can be obtained by additionally providing a displacement device configured such that the operator seat is linearly adjustable, particularly essentially in the longitudinal direction of the pivoting arm relative thereto. Thus, the displacement device enables the position of the operator seat to be variable in a horizontal longitudinal direction, particularly in the longitudinal direction of the pivoting arm. This enables the operator to particularly well adjust the distance between the operator seat and the operating panel to an optimum at different pivoting positions, in particular together with the aforesaid adjustment options. Such a displacement device can be obtained, for example, by means of a seat rail known from the prior art.

In order to obtain a reliable seat positioning, it is preferred that a first seat arresting device is provided, by means of which the operator seat can be arrested relative to the pivoting arm, and that a complementary second seat arresting device is provided, by means of which the pivoting arm can be arrested relative to the operator platform base. Since two functionally separated seat arresting devices are provided, the positioning of the operator seat relative to the pivoting arm and the positioning of the entirety of operator seat and pivoting arm relative to the operator platform base, respectively the operating panel, can be effected independently of one another, which facilitates the operation. Thus, the first seat arresting device preferably arrests the seat about the pivot axis between the pivoting device, in particular the pivoting arm, and the seat per se. In contrast, the second seat arresting device preferably arrests the pivoting device pivotable about particularly another pivot axis relative to the operator platform base, in particular the pivoting arm per se, relative to the operator platform base. Further, both seat arresting devices are preferably configured such that they can be actuated independently of one another.

In order to provide the operator seated in the operator seat with an operational environment as identical as possible at different positions of the operating panel, the operating panel mount and the operator seat mount are preferably configured such that, in a projection of the operating panel in its pivoting positions in a horizontal reference plane relative to the operating panel, the relative position of the operator seat to the operating panel is essentially identical in the first and in the second pivoting position. As a result, the operator encounters the same distances to individual operating elements on the operating panel in both positions, so that he or she does not need to adapt when the operating panel is at different positions, for example. This increases operational safety. For example, this is achieved in that the adjusting paths of the operating panel mount and of the operator seat mount are configured in such a comprehensive manner that they can be brought into the same position relative to one another even, for example, at different pivoting positions of the operating panel. Thus, both elements are then "pivoted" about a common vertical "virtual" axis and are preferably disposed, at least essentially, on a radial line relative to said axis. However, adjustment is performed functionally separated from one another.

Particularly for comparatively large construction machines, such as, in particular, road milling machines of the central rotor milling machine type or the road paver type, it is preferred that the operator platform comprises a total of two operator seats and two operating panels as described above, the two operator seats being arranged transversely to the working direction of the construction machine side by side in the in each case lateral region of the operator platform. As a result, the operator may benefit from the advantages of the present invention on both sides of the operator platform, i.e., on the right side and on the left side of the construction machine with respect to the working direction.

It is preferred for the operator seat mount to be configured such that the operator seat is adjustable at least partially beyond a lateral outer wall or a side wall of the construction machine. Then the operator seat partially projects beyond the outer edge of the machine in the horizontal direction. The operator seated in the operator seat is in this case in a seat position that partially protrudes from the side of the construction machine, from which position he or she has particularly good view of the area located next to the construction machine.

With respect to its scope of functions, the operator platform according to the present invention is particularly suitable for road construction machines, especially for road milling machines, very particularly for central rotor milling machines having a milling width greater than 1.5 m, and for road pavers.

BRIEF DESCRIPTION OF THE DRAWINGS

The present invention will be described below in greater detail by means of an exemplary embodiment indicated in the drawings. In the schematic figures.

In the drawings, like components are designated with like reference numerals, wherein not each of the components repeatedly shown in the drawings is necessarily designated with reference numerals in each of the drawings.

DETAILED DESCRIPTION OF THE INVENTION

Figure 1:
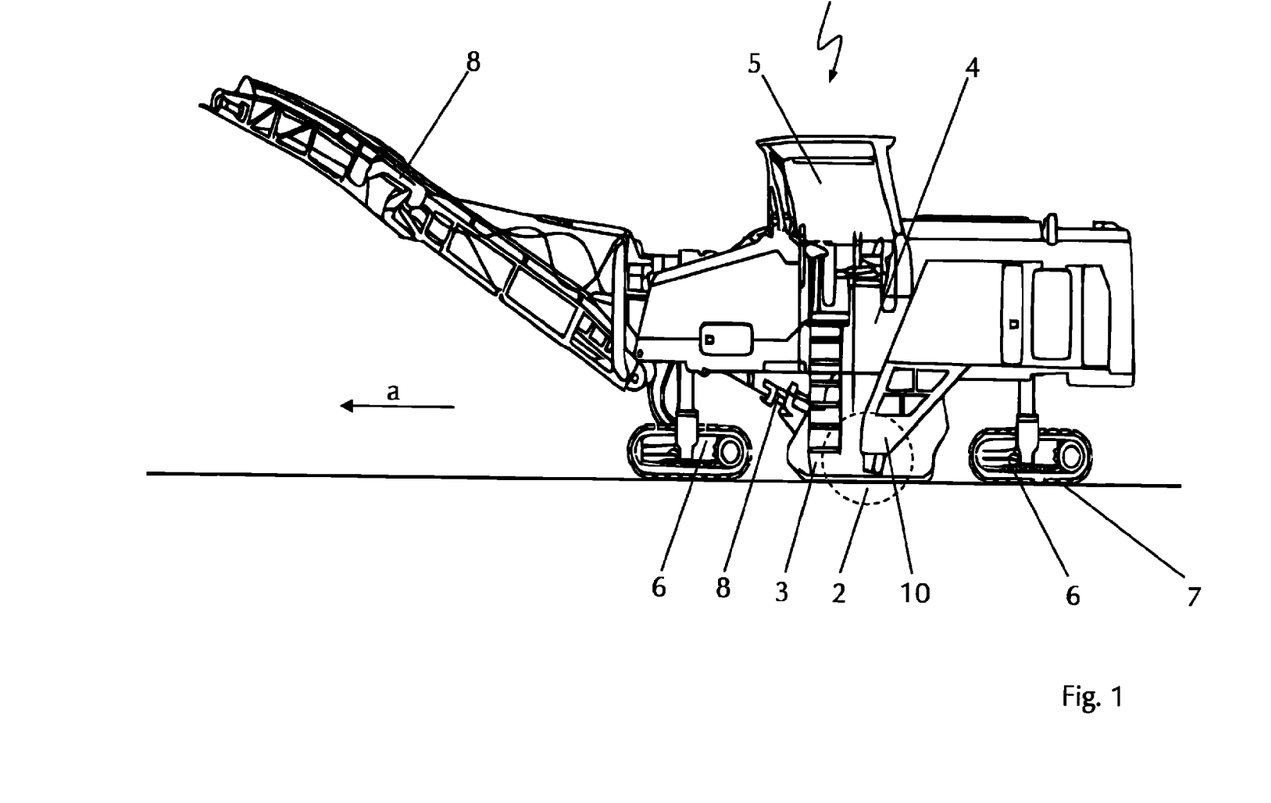
FIG. 1 is a side view of a road milling machine.

FIG. 1 shows an exemplary construction machine which is particularly suitable for use of the operator platform according to the present invention described in greater detail hereinafter. The construction machine is a ground milling machine, in the present case a road milling machine 1 of the central rotor milling machine type. Such road milling machines are usually used for the repair or maintenance of roadways. Essential elements of such a road milling machine are a working device 2, here a milling drum arranged in a milling drum box 3. The milling drum box 3 is mounted on a machine frame 4. Further, an operator platform 5 is arranged on the machine frame 4 from which an operator operates the road milling machine 1 during operation. The self-propelled road milling machine 1 further comprises travelling devices 6 connected to the machine frame via lifting columns not described in more detail here, which travelling devices may be crawler tracks or wheels. During operation, the road milling machine 1 moves over the ground material 7 to be processed and mills ground material, which is removed from the milling drum box 3 via the conveyor devices 8. The drive energy required for travelling and working operation is provided by a drive engine not described in more detail. Further, a drive train 10 (only partially shown in FIG. 1) is provided for driving the rotational movement of the milling drum 2. Further details of the construction and functioning of the operator platform will become apparent from the figures below.

Figure 2:
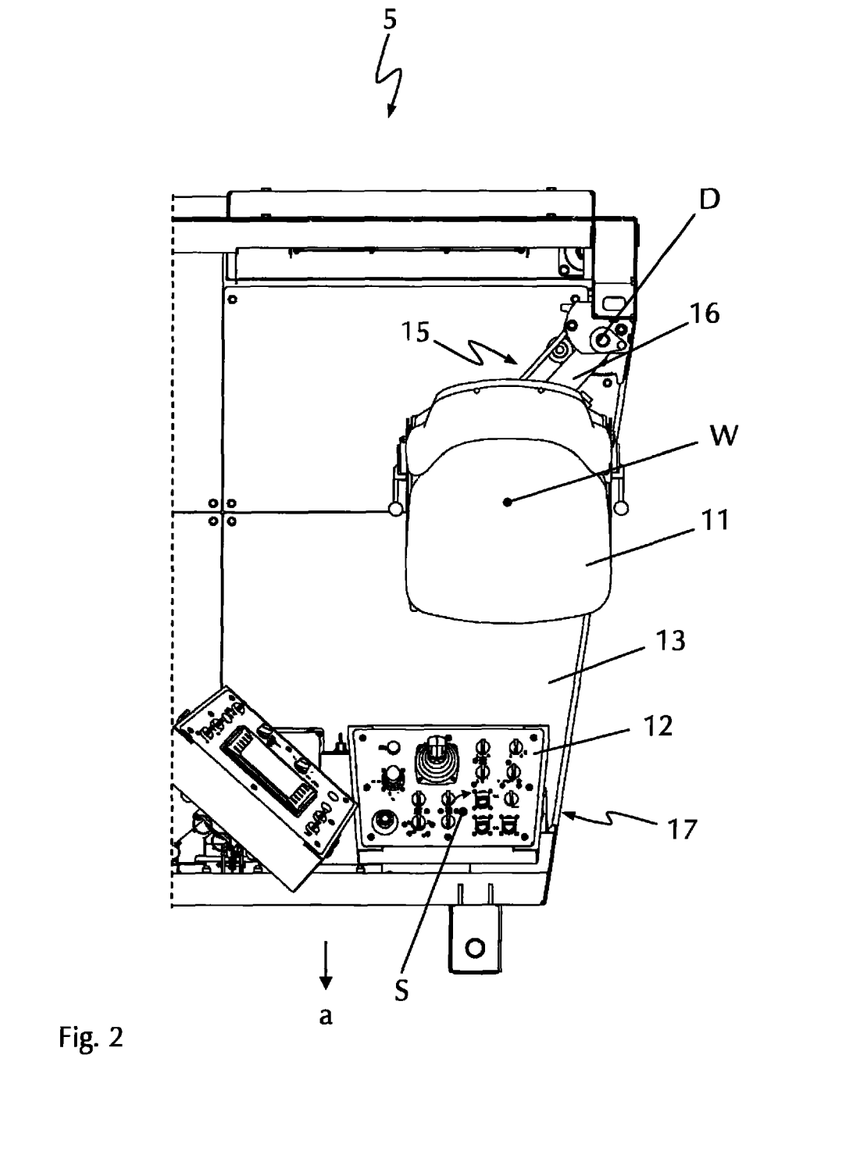
FIG. 2 is a top view of the left portion of the operator platform of FIG. 1 with the operating panel and the operator seat in a first end position.
Figure 6:
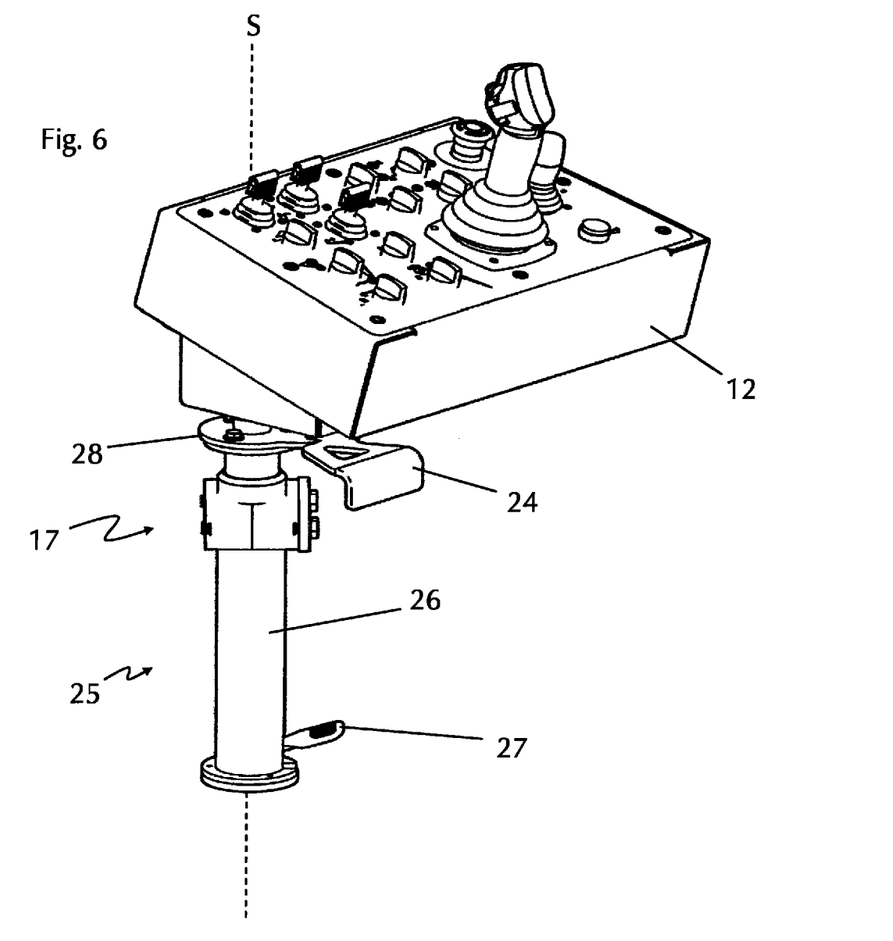
FIG. 6 is a perspective oblique view of the operating panel in a lowered position.

Essential elements of the operator platform 5 are an operator seat 11 and an operating panel 12 positioned in front of the operator seat 11 in the working direction a. The operating panel 12 comprises multiple operating elements with which travelling or operating instructions for the working device, particularly the milling drum 2, for example, can be entered by the operator seated in the operator seat 11. The operating panel 12 is connected to the operator platform base 13 via an operating panel mount 17, wherein details on the structure of the operating panel mount 17 can be seen from FIGS. 6 and 7. The operating panel mount 17 enables pivoting of the operating panel 12 about a vertical pivot axis S. In FIG. 2, the operating panel 12 can be seen in its inner, pivoted-in end position and in FIGS. 3 and 4 in its outer, pivoted-out end position. Between said end positions, the operating panel 12 can also be arrested in intermediate positions.

Figure 3:
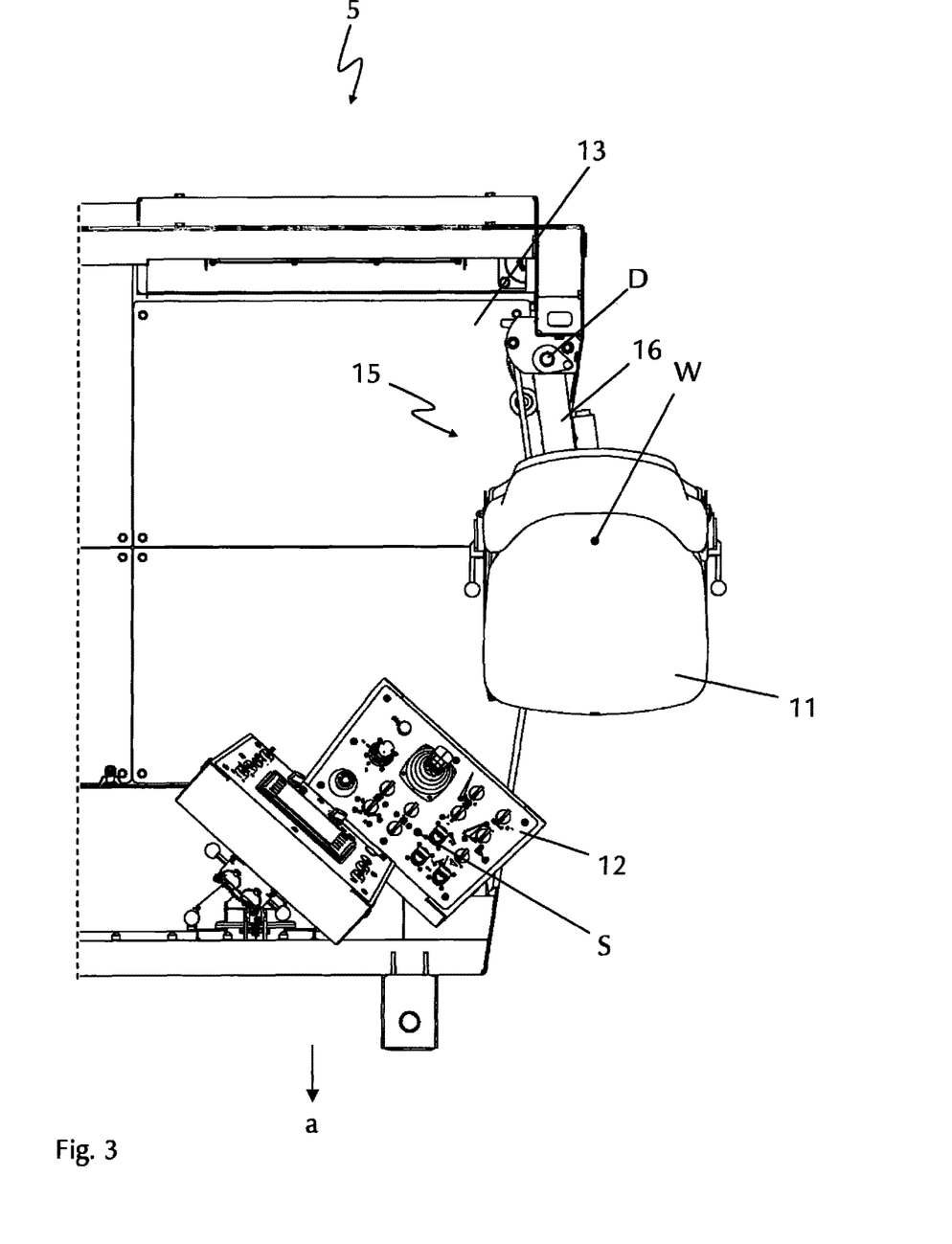
FIG. 3 is the top view of FIG. 2 with the operating panel in a second end position and the operator seat in an intermediate position.
Figure 4:
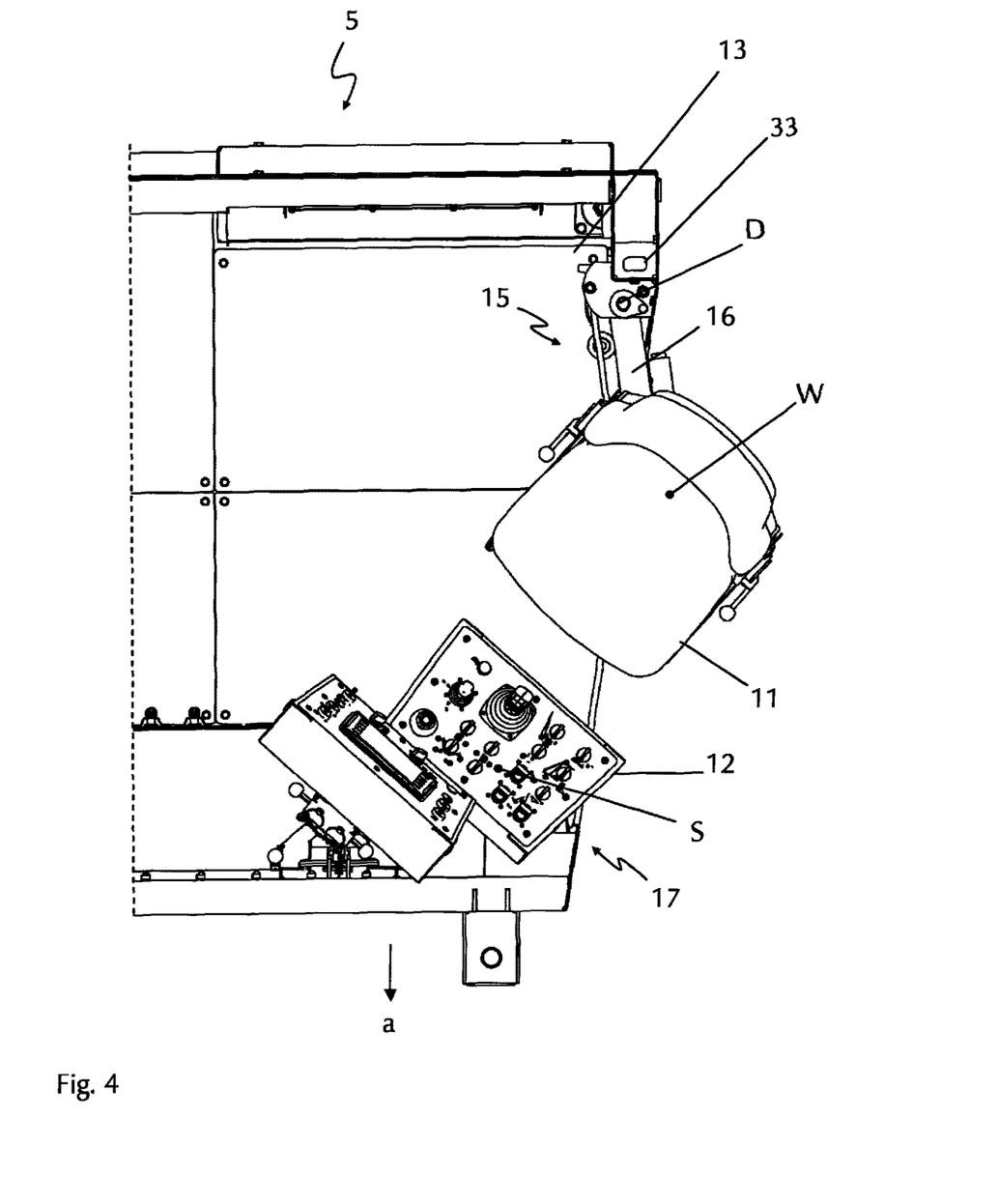
FIG. 4 is the top view of FIG. 3 with the operating panel and the operator seat each in a second end position.

Spatially and functionally independent of the operating panel mount 17, an operator seat mount 15 is provided. Via the operator seat mount 15, the operator seat 11 is connected with the operator platform base 13 or to the operator platform base 13, for example, also with the machine frame 4. The operator seat mount enables on the one hand a rotating movement of the operator seat 11 about a vertical axis W, which runs through the seating surface of the operator seat 11, and, independently thereof, an adjustment movement about the vertical pivot axis D. For example, this enables on the one hand pivoting out the operator seat 11 about the pivot axis D from the inner position indicated in FIG. 2, in which the operator seat 11 in a top view is almost entirely positioned within the horizontal outer limits of the construction machine 1 or within the area of the operator platform base 13, to the outer position indicated in FIGS. 3 and 4, in which the operator seat 11, particularly with its vertical axis W, essentially projects beyond the outer limits of the construction machine 1 or is positioned outside the area of the operator platform base 13. Additionally or alternatively, the operator seat 11 can be rotated about the axis W without essentially changing the local position of the operator seat 11 on the operator platform 5 in relation to the entire machine. This is illustrated by the comparison of FIGS. 3 and 4. As a result, the operator can change his or her main view direction from the operator seat 11.

Figure 5A:
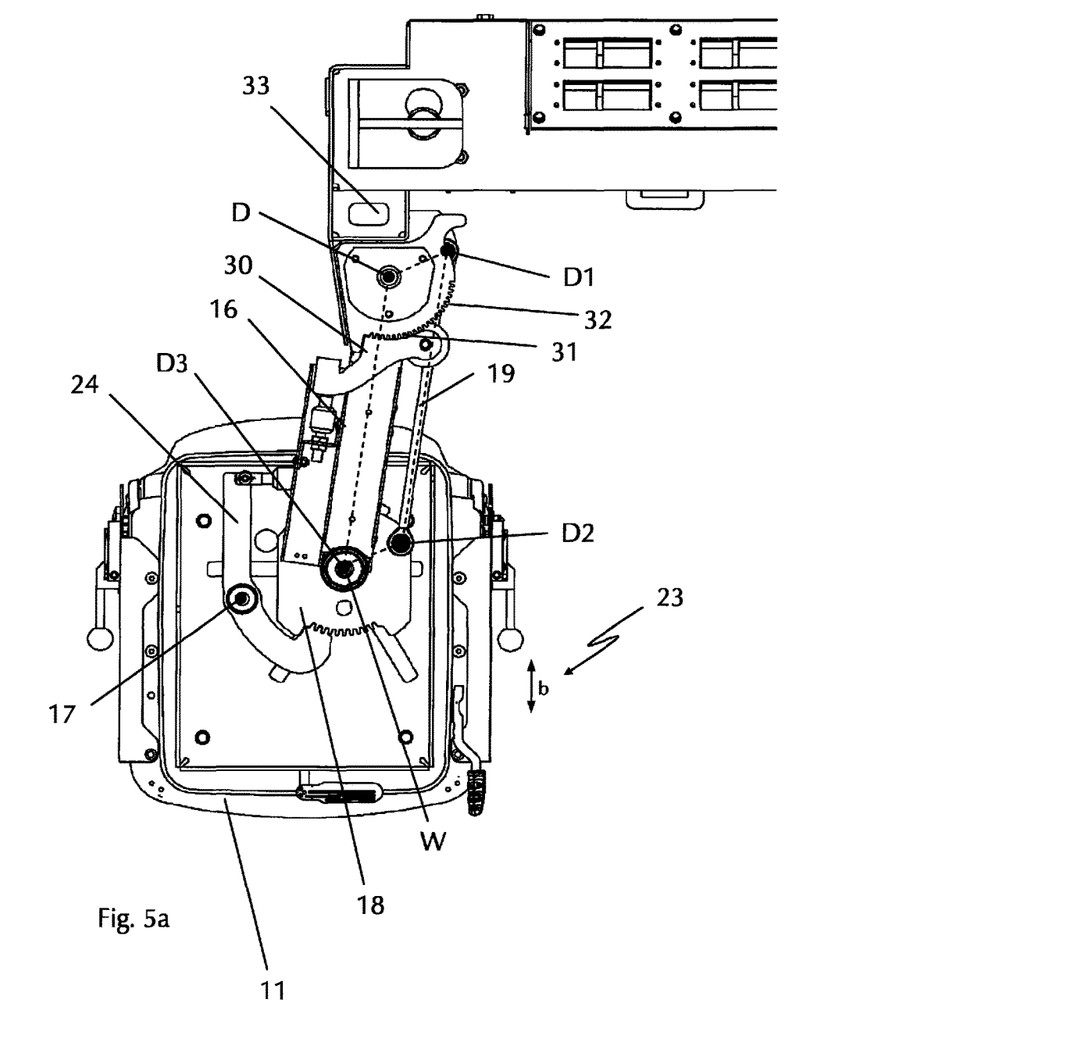
FIG. 5a is a top view of the bottom side of the operator seat of FIG. 3.
Figure 5B:
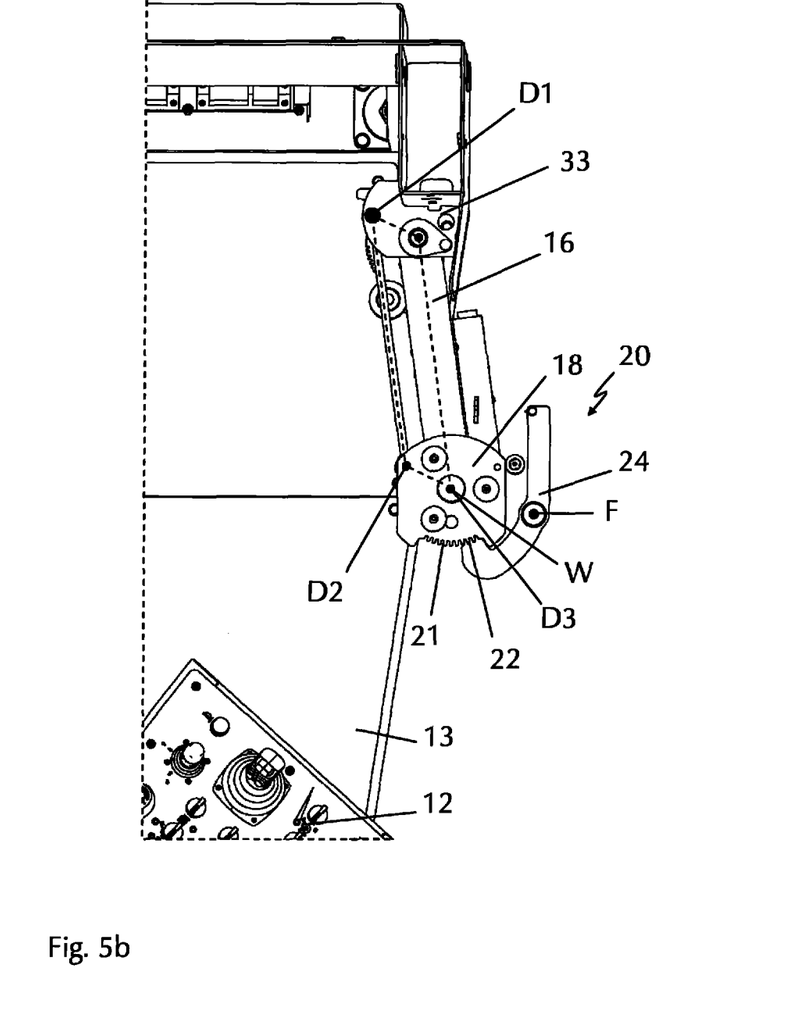
FIG. 5b is an enlarged detail view of the top view of FIG. 3 with removed operator seat.

FIGS. 5*a* and 5*b* illustrate details of the structure of the operator seat mount 15. In FIG. 5*a*, the operator seat 11 is illustrated in a view from below. In the top view from above according to FIG. 5*b*, the operator seat 11 is removed in order to illustrate further structural details. Both figures are described in conjunction for further describing the adjustment mechanism. The operator seat 11 is connected to the pivoting arm 16 via a support bracket 18 about the rotational axis W. The pivoting arm 16 is part of a link mechanism in the form of a parallelogram mechanism, the vertical joint axes of which are referred to as D, D1, D2 and D3. The joint axes D and D1 are fixed in position relative to the operator platform base 13. The joint axes D1 and D2 are connected to a link rod 19. The joint axes D2 and D3 are situated in the support bracket 18, and the pivoting arm 16 comprises the joint axis D3 on its seat end and the joint axis D on its operator platform end.

The support bracket 18 and thus the operator seat 11, which is not shown in FIG. 5*b*, is rotatable relative to the pivoting arm 16 about the axis W, the locking device 20 enabling an arrestment of the rotational position of the support bracket 18 relative to the pivoting arm 16. The locking device 20 comprises a control lever 24 mounted on the operator seat 11 such that it is rotatable about the axis F, which lever has a latch toothing 22 engaging a segment-type sprocket 21 arranged on the support bracket 18. The sprocket 21 is provided on both sides with in each case one adjustment stop 21*a*/21*b*, limiting the adjustment range of the support bracket 18 relative to the pivoting arm 16.

FIG. 5*a* shows that another locking device 30 is provided in a complementary manner, comprising a sprocket 31 arranged on a control lever and a latch toothing 32. Said locking device 30 is provided for locking the pivoting arm which is connected to the operator platform via a pivoting arm mount 33 relative to the operator platform in various pivoting positions. Thus, the adjustment of the parallelogram mechanism is arrested by means of the locking device 24.

Further, a displacement device 23 not described in more detail is provided. Said device enables displacing the operator seat 11 linearly along a seat rail in arrow direction b in the horizontal direction independently of a rotational movement about the axes D or W. The displacement device 23 also comprises a locking device not described in more detail.

Independent of the above described range of functions of the operator seat mount 15, the operating panel 12 as well is adjustable in its relative position to the operator platform base 13. Further details will become apparent from FIGS. 6 and 7. According to one embodiment in addition to and independently of the pivoting of the operating panel 12 about the vertical axis S, the operating panel mount 17 enables changing the position of the operating panel 12 in vertical direction with a height adjustment device 25. This is specifically shown in FIG. 7, in which the operating panel 12 indicated in solid lines is shown pivoted-out and raised and, indicated in dashed lines, lowered and pivoted-in. The height adjustment is effected along the axis S.

Figure 7:
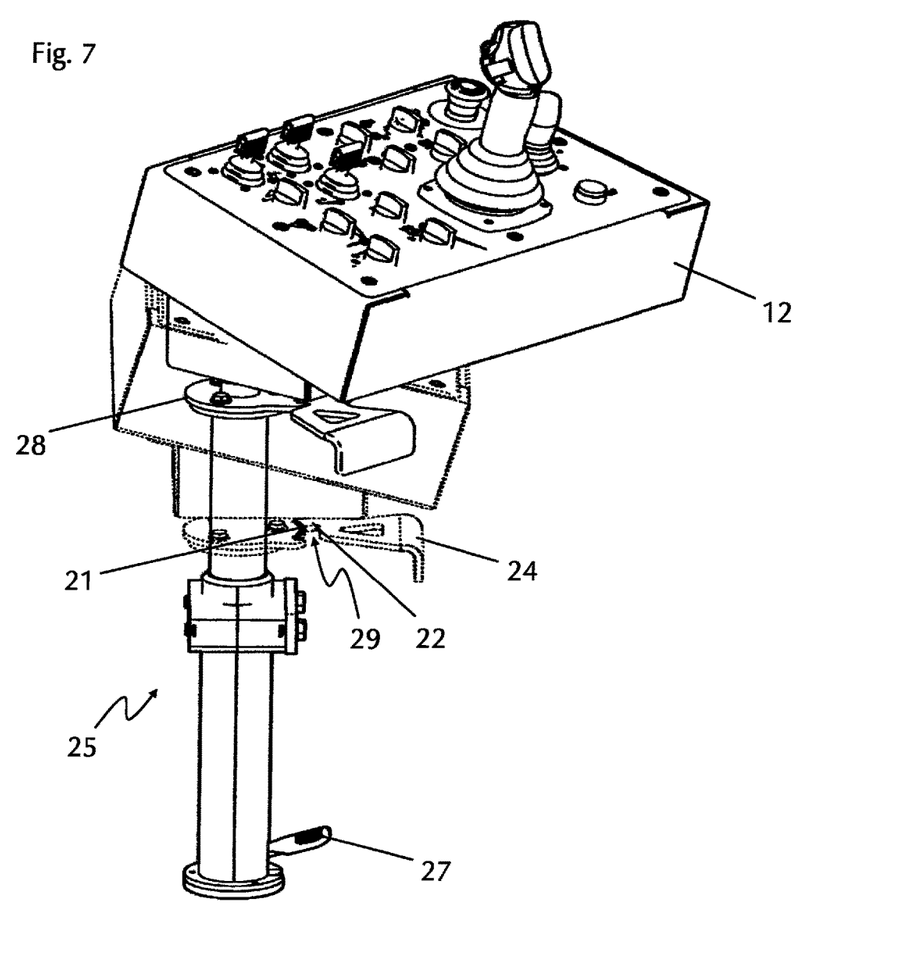
FIG. 7 shows the operating panel of FIG. 6 in a raised position.

In this exemplary embodiment, the height adjustment device 25 comprises a gas pressure spring which is not described in further detail and is arranged inside a support column 26 extending in the vertical direction. Said spring acts in the upward direction and can be unblocked by a foot pedal 27. In the upper region of the support column 26, a pivot joint 28 is provided, the joint axis of which is located in the axis S. The operating panel 12 is connected to the head region of the support column 26 by means of the pivot joint 28. A locking device 29 is provided here as well, the structure of which essentially corresponds to the structure of the locking device 20 as shown with the dashed line in FIG.

7 for the lowered position. Functionally similar elements are designated by the corresponding reference numerals.

An essential effect of the above described overall structure will become apparent particularly when comparing FIGS. 2 and 4. The specific configuration of the operator seat mount 15 and the operating panel mount 17 makes it possible to enable an essentially identical relative orientation of the operator seat 11 and the operating panel 12 to one another at different rotational positions of the operating panel 12. In said process, adjustment of the operating panel 12 and of the operator seat 11 is effected completely separately and independently of one another, which is why the operator is able to adjust the positions of the operating panel 12 and the operator seat 11 on the one side with respect to the operator platform base 13, respectively the essential elements of the construction machine 1, in a wide range, but at the same time the operator is able to adjust the relative position of the operating panel 12 to the operator seat 11 comparatively similarly, if desired.

The advantageous effects of the above described basic arrangement will become apparent when comparing particularly FIGS. 2 and 4. On the one side, the operator seat 11 and the operating panel 12 can be movably mounted on the operator platform 5 independently of and spaced apart from one another. At the same time, however, the operator seat 11 can be brought into the essentially same relative position in different pivoting positions, particularly into a position in which the operator is seated straight in front of the operating panel 12. As a result, the operator may operate the operating panel 12 under the physiologically same conditions even at different pivoting positions and reaches the individual operating elements in a comfortable manner. Another advantage of the exemplary embodiment is that the operator seat 11 can be pivoted out of the operator platform 5 so far that the operator may view the floor along the side of the construction machine 1. This enables a very precise maneuvering of the construction machine 1. The operator may reach and operate the operating panel 12 in the usual manner even at this position. Finally, another advantage resides in the height adjustability of the operating panel 12, which additionally significantly increases general operating comfort.

Figure 8:
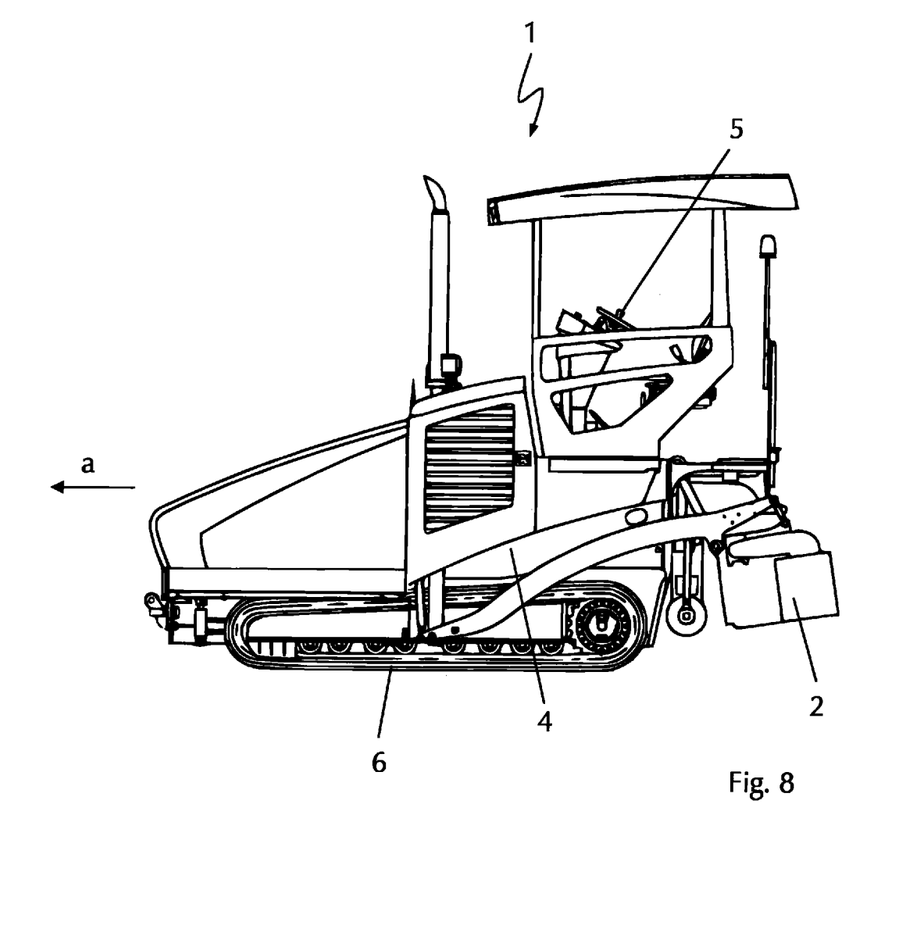
FIG. 8 is a side view of a road paver.

FIG. 8 shows another road construction machine, more specifically a road paver 1, comprising an operator platform 5 as described in FIGS. 2 to 7. The working device 2 is in this case a paving screed as known from the prior art. With regard to the configuration of the operator platform 5, reference is thus made to the aforesaid Figures.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. An operator platform for a construction machine, comprising:
   an operator platform base;
   an operating panel;
   an operator seat; and
   an operating panel mount including a pivoting device by which the operating panel is pivotable about a vertical axis (D) between a first pivoting position and a second pivoting position,
   wherein the operating panel mount comprises a height adjustment device which is configured such that the operating panel can be locked at different height positions independently of the pivoting position,
   wherein the operator seat is mounted on an operator seat mount with the operating panel mount being spatially and functionally independent of the operator seat mount,
   and further wherein the adjustment axis of the height adjustment device runs coaxially with a pivot axis (S) of the operating panel mount.

2. The operator platform according to claim 1, wherein the height adjustment device is configured such that the operating panel is continuously adjustable within an adjustment range extending in the vertical direction.

3. The operator platform according to claim 1, wherein the height adjustment device comprises a gas pressure spring.

4. The operator platform according to claim 1, wherein the operating panel mount comprises a support column extending in the vertical direction and having a base region and a head region, and further wherein a pivot joint is provided in the head region of the support column by which the operating panel is pivotable with the support column about the vertical pivot axis (S).

5. The operator platform according to claim 1, wherein a locking device is provided which is configured such that it arrests a pivoting position of the operating panel relative to the operating panel mount.

6. The operator platform according to claim 5, wherein the locking device comprises a notched rim and a latching element adjustable between a released position and a latching position, the latching element engaging the notched rim in the latching position and being out of engagement from the notched rim in the released position.

7. The operator platform according to claim 5, wherein the locking device comprises a control lever arranged underneath the operating panel for adjusting the latching element.

8. The operator platform according to claim 7, wherein the control lever is an element fixedly connected to the latching element.

9. An operator platform for a construction machine, comprising:
   an operator platform base;
   an operating panel;
   an operator seat; and
   an operating panel mount including a pivoting device by which the operating panel is pivotable about a vertical pivot axis (D) between a first pivoting position and a second pivoting position,
   wherein the operator seat is mounted on an operator seat mount which is configured such that the operator seat is adjustable between an end position pivoted-in relative to the operator platform base and an end position pivoted-out and at least partially projecting relative to the operator platform base.

10. The operator platform according to claim 9, wherein the operator seat mount comprises a pivoting arm with a seat end and an operator platform end, the pivoting arm comprising a support bracket at its seat end by which the operator seat is mounted on the pivoting arm, and comprising at its operator platform end a pivoting arm mount by which the pivoting arm is connected to the operator platform base such that it is pivotable about a vertical pivot axis (D).

11. The operator platform according to claim 10, wherein the pivoting arm is part of a link mechanism.

12. The operator platform according to claim 10, wherein a displacement device is provided which is configured such that the operator seat is adjustable in the longitudinal direction of the pivoting arm relative thereto.

13. The operator platform according to claim 10, wherein a first seat arresting device is provided by which the operator seat can be arrested relative to the pivoting arm, and further wherein a second seat arresting device is provided by which the pivoting arm can be arrested relative to the operator platform base.

14. The operator platform according to claim 9, wherein the operating panel mount and the operator seat mount are configured such that the position of the operator seat is essentially identical relative to the operating panel in a projection into a horizontal reference plane in both the first pivoting position and in the second pivoting position.

15. The operator platform according to claim 9, wherein the operator seat mount is configured such that the operator seat is at least partially adjustable beyond a lateral outer wall of the construction machine.

16. The operator platform according to claim 1, wherein the operator platform comprises two operator seats, the two operator seats being arranged transversely to a working direction (a) of the construction machine side by side in the in each case lateral region of the operator platform.

17. A construction machine, comprising an operator platform according to claim 1.

18. The operator platform according to claim 6, wherein the notched rim is in the form of a sprocket segment.

19. The operator platform according to claim 11, wherein the link mechanism comprises a four-joint link mechanism.

20. The construction machine according to claim 17, wherein the construction machine comprises a road construction machine.

* * * * *